(12) United States Patent
Chandrashekar et al.

(10) Patent No.: US 12,439,130 B2
(45) Date of Patent: Oct. 7, 2025

(54) OPTIMAL METHOD TO SIGNAL WEB-BASED SUBTITLES

(71) Applicant: Adeia Guides Inc., San Jose, CA (US)

(72) Inventors: Padmassri Chandrashekar, Karnataka (IN); Reda Harb, Bellevue, WA (US)

(73) Assignee: ADEIA GUIDES INC., San Jose, CA (US)

( * ) Notice: Subject to any disclaimer, the term of this patent is extended or adjusted under 35 U.S.C. 154(b) by 43 days.

(21) Appl. No.: 17/245,458

(22) Filed: Apr. 30, 2021

(65) Prior Publication Data

US 2022/0353584 A1    Nov. 3, 2022

(51) Int. Cl.
*H04N 7/10* (2006.01)
*H04N 21/2187* (2011.01)
*H04N 21/439* (2011.01)
*H04N 21/488* (2011.01)

(52) U.S. Cl.
CPC ..... *H04N 21/4884* (2013.01); *H04N 21/2187* (2013.01); *H04N 21/4394* (2013.01)

(58) Field of Classification Search
CPC .......... H04N 21/4884; H04N 21/2187; H04N 21/4394
USPC ........................................................ 725/32
See application file for complete search history.

(56) References Cited

U.S. PATENT DOCUMENTS

| | | | | |
|---|---|---|---|---|
| 6,061,056 | A * | 5/2000 | Menard | H04N 21/4826 715/704 |
| 7,761,892 | B2 | 7/2010 | Ellis et al. | |
| 8,782,721 | B1 * | 7/2014 | Kellicker | H04N 21/234336 725/91 |
| 9,202,522 | B2 * | 12/2015 | Dhawan | H04N 13/183 |
| 9,535,990 | B2 * | 1/2017 | Skolicki | G06F 16/739 |
| 10,225,625 | B2 * | 3/2019 | Homyack | H04N 5/445 |
| 10,511,802 | B2 * | 12/2019 | Tsukagoshi | H04N 21/4343 |
| 10,798,145 | B1 * | 10/2020 | Garney | H04N 21/2407 |
| 11,134,317 | B1 * | 9/2021 | Rafferty | H04N 21/278 |
| 12,200,395 | B2 * | 1/2025 | Chandrashekar | H04N 21/4884 |
| 2008/0284910 | A1 * | 11/2008 | Erskine | H04N 5/9206 348/E7.001 |
| 2010/0332214 | A1 * | 12/2010 | Shpalter | H04N 21/4884 382/176 |
| 2013/0159940 | A1 * | 6/2013 | Duffy | G06F 3/017 715/863 |
| 2013/0311575 | A1 * | 11/2013 | Woods | H04N 21/8456 709/206 |
| 2013/0334300 | A1 * | 12/2013 | Evans | H04N 21/47217 235/494 |

(Continued)

*Primary Examiner* — Benjamin R Bruckart
*Assistant Examiner* — Sahar Aqil Riaz
(74) *Attorney, Agent, or Firm* — HALEY GUILIANO LLP (57) ABSTRACT

The present disclosure relates to providing closed caption data to a media player. More particularly, the present invention relates to implementing a referencing mechanism leveraging repetition of content to transmit less closed caption data to a client device. Improved closed captioning and subtitling methods, mechanisms, techniques and systems described herein are introduced to provide a better viewing experience for a viewer of a media asset such as video, audio, or the like. As such, methods and systems are provided herein that reduces the signaling of unnecessary bytes to a media device and provides a more efficient way of providing timed text to the media device.

20 Claims, 6 Drawing Sheets

(56) References Cited

U.S. PATENT DOCUMENTS

| | | | |
|---|---|---|---|
| 2014/0028912 A1* | 1/2014 | Lenzi | H04N 21/4884 348/468 |
| 2015/0082349 A1* | 3/2015 | Ishtiaq | H04N 21/4316 725/40 |
| 2015/0149473 A1* | 5/2015 | Wheatley | G06F 16/41 707/741 |
| 2015/0208139 A1* | 7/2015 | Homyack | H04N 5/445 348/468 |
| 2015/0339382 A1* | 11/2015 | Skolicki | H04N 21/8549 707/722 |
| 2016/0014482 A1* | 1/2016 | Chen | H04N 21/8456 386/241 |
| 2016/0133251 A1* | 5/2016 | Kadirkamanathan | G06F 40/216 704/9 |
| 2016/0239571 A1* | 8/2016 | Rowe | H04N 21/251 |
| 2016/0360279 A1* | 12/2016 | Batmanglidj | H04N 21/4348 |
| 2018/0007108 A1* | 1/2018 | Kärkkäinen | H04L 65/762 |
| 2019/0132372 A1* | 5/2019 | Litsyn | H04L 67/12 |
| 2019/0205373 A1* | 7/2019 | Walsh | H04N 21/435 |
| 2019/0303402 A1* | 10/2019 | Berry | G06F 16/71 |
| 2020/0007946 A1* | 1/2020 | Olkha | G06F 40/263 |
| 2020/0260129 A1* | 8/2020 | Strein | H04N 21/4884 |
| 2020/0334290 A1* | 10/2020 | Dontcheva | G06F 16/738 |
| 2021/0035597 A1* | 2/2021 | Eubank | H04S 7/304 |
| 2021/0329325 A1* | 10/2021 | Landow | H04N 21/8126 |

\* cited by examiner

```
<body region="subtitle Area">
  <div>
    <p xml:id="subtitle 1" begin="0.76s" end="3.45s">
    It seems a paradox, does it not,
    </p>
  </div>
</body>
```

304

```
<body region="subtitle Area">
  <div>
    <p xml:id="subtitle 1" begin="3.45s" end="3.50s">
    It seems a paradox, does it not
    </p>
  </div>
</body>
```

```
Seg-1
<body region="subtitle Area">
  <div>
    <p xml:id="subtitle1" ref:NULL begin="0.76s" end="3.45s">
    It seems a paradox, does it not.
    </p>
  </d iv>
</body>
```

404

```
Seg-2
<body region="subtitle Area">
  <div>
    <p xml:id="subtitle1" ref:Seg-1 end="3.49s">
    </p>
  </d iv>
</body>
```

406

```
Seg-3
<body region="subtitle Area">
  <div>
    <p xml:id="subtitle 1" ref:Seg-2 end="3.53s">
    </p>
  </d iv>
</body>
```

OPTIMAL METHOD TO SIGNAL WEB-BASED SUBTITLES

FIELD

The present disclosure relates to providing closed caption data to a media player. More particularly, the present invention relates to implementing a referencing mechanism leveraging repetition of content to transmit less closed caption data to a client device.

BACKGROUND

Closed captioning and subtitling are processes of displaying text on a visual display to provide additional textual or interpretive information to a user consuming a media asset. Closed captions and subtitles may also be referred to colloquially as timed text. Timed text comprises text and timing information and refers to the presentation of textual content in sync with a media asset being consumed by a user. Timed text is conventionally shown as a transcription of an audio portion of a media asset, e.g., a video, as it occurs, in substantially real time.

In conventional systems, closed captioning and subtitling utilize audio-to-text recognition as video segments are downloaded by a client device. Today, many online content and TV services utilize live closed-captioning software to transcribe an audio with a dialogue or even, in some cases, to detect and transcribe non-speech elements such as the sound of thunder, a baby crying or a dog barking, for example. Conventional systems are typically powered by artificial intelligence and automatic speech recognition (ASR) software. The output of the closed-captioning software is fed to a closed caption encoder and delivered as a timed-text file, or a sidecar file for example, to a media player or client device.

In some cases, closed caption data can be embedded into a media asset file, e.g., video file, or delivered separately in what is known as a sidecar file. The video and associated audio transcription are output at the client device in sync as the player receives the transcript and timing information for when the audio transcription is to be presented. Client devices that have a parser will apply the properties of the encoded timed text accordingly. However, the same process cannot be implemented for live content or on-demand content that requires real-time transcription of content. During live content, for example, the timed-text file may be transmitted to a client device as transcriptions becomes available, as there is no way to predict the audio that will be output at a future time instance, e.g., 5 minutes from the live stream, for example.

SUMMARY

In view of the foregoing, there is a need to provide timed text in a more efficient and effective manner. More specifically, it would be beneficial to have a methods and systems that reduce the number of unnecessary bytes signaled to a client device and provides a more efficient way of providing timed text on a client device. Improved captioning and subtitling methods, mechanisms, techniques and systems described herein are introduced to provide a better experience for a consumer of a media asset such as video, audio, and the like.

According to a first aspect, a method of providing timed text for live media content is provided. In example embodiments, the method comprises a step of receiving timed-text segments in sync with a media asset and a step of storing locally, at a media device, one or more portions of the timed-text segments in an index for reference. The method further comprises a step of determining a new timed-text segment to be provided in sync with the media asset and a step of referencing the new timed-text segment against the one or more portions of the timed-text segments stored in the index. The method further comprises a step of, upon determining that at least a portion of the new timed-text segment matches one of the one or more portions of the timed-text segments, retrieving a matched portion of timed-text segment from the index and a step of providing the matched portion of the timed-text segment for display in sync with the media asset in place of the portion of the new timed-text segment.

In some embodiments, the step of receiving timed-text segments comprises transcribing a speech and/or non-speech element of the media asset, and providing the transcribed speech and/or non-speech element to the media device for display in sync with the media asset.

In some embodiments, the step of storing locally one or more portions of the timed-text segments comprises determining an occurrence of each portion of each of the timed-text segments during the media asset and, upon determining that the occurrence of at least one portion of the timed-text segments is above a predetermined threshold, storing the at least one portion in the index.

In some embodiments, the step of storing locally one or more portions of the timed-text segments further comprises storing a limited number of the one or more portions based on the occurrence of each portion of each of the timed-text segments.

In some embodiments, the step of storing locally one or more portions of the timed-text segments further comprises replacing one or more of the one or more portions stored in the index with one or more new portions of timed text based on the occurrence of each portion of each of the timed-text segments.

In some embodiments, the index comprises one or more sub-indexes based on timed-text segments associated with one or more categories comprising any one or more of speech elements, non-speech elements, a character, or a location.

In some embodiments, the timed-text segments associated with one or more categories the media asset is determined using content identification.

In some embodiments, the index comprises index locations for referencing.

According to a second aspect, a system for providing timed text for live media content is provided. The system comprises means for receiving timed-text segments in sync with a media asset and means for storing locally, at a media device, one or more portions of the timed-text segments in an index for reference. The system further comprises means for determining a new timed-text segment to be provided in sync with the media asset and means for referencing the new timed-text segment against the one or more portions of the timed-text segments stored in the index. The system further comprises, upon determining that at least a portion of the new timed-text segment matches one of the one or more portions of the timed-text segments, means for retrieving a matched portion of the timed-text segment from the index and means for providing the matched portion of the timed-text segment for display in sync with the media asset in place of the portion of the new timed-text segment.

According to a further aspect, a system is provided comprising control circuitry configured to execute the method of the first aspect.

According to a further aspect, a non-transitory computer-readable medium is provided comprising non-transitory computer-readable instructions encoded thereon for carrying out the method of the first aspect.

It should be appreciated that other features, aspects and variations of the present invention will be apparent from the disclosure herein of the drawings and detailed description. Additionally, it will be further appreciated that additional or alternative embodiments of parent control or techniques for limiting user exposure to content may be implemented within the principles set out by the present disclosure.

BRIEF DESCRIPTION OF THE DRAWINGS

The above and other objects and advantages of the disclosure will be apparent upon consideration of the following detailed description, taken in conjunction with the accompanying drawings, in which.

The figures herein depict various embodiments of the disclosed invention for purposes of illustration only. It will be appreciated that additional or alternative structures, systems and methods may be implemented within the principles set out by the present disclosure.

DETAILED DESCRIPTION

As referred to herein, a "media guidance application" or a "guidance application" is an application that provides media guidance data to a user through an interface. For example, a media guidance application may allow users to efficiently navigate content selections and easily identify content that they may desire. The media guidance application and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory (RAM), etc.

As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

As referred to herein, the terms "media asset" and "media content" should be understood to mean an electronically consumable user asset, such as a live televise program, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate and locate content.

As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smartphone, or any other television equipment, computing equipment, or wireless device, and/or combination of the same.

Figure 1:
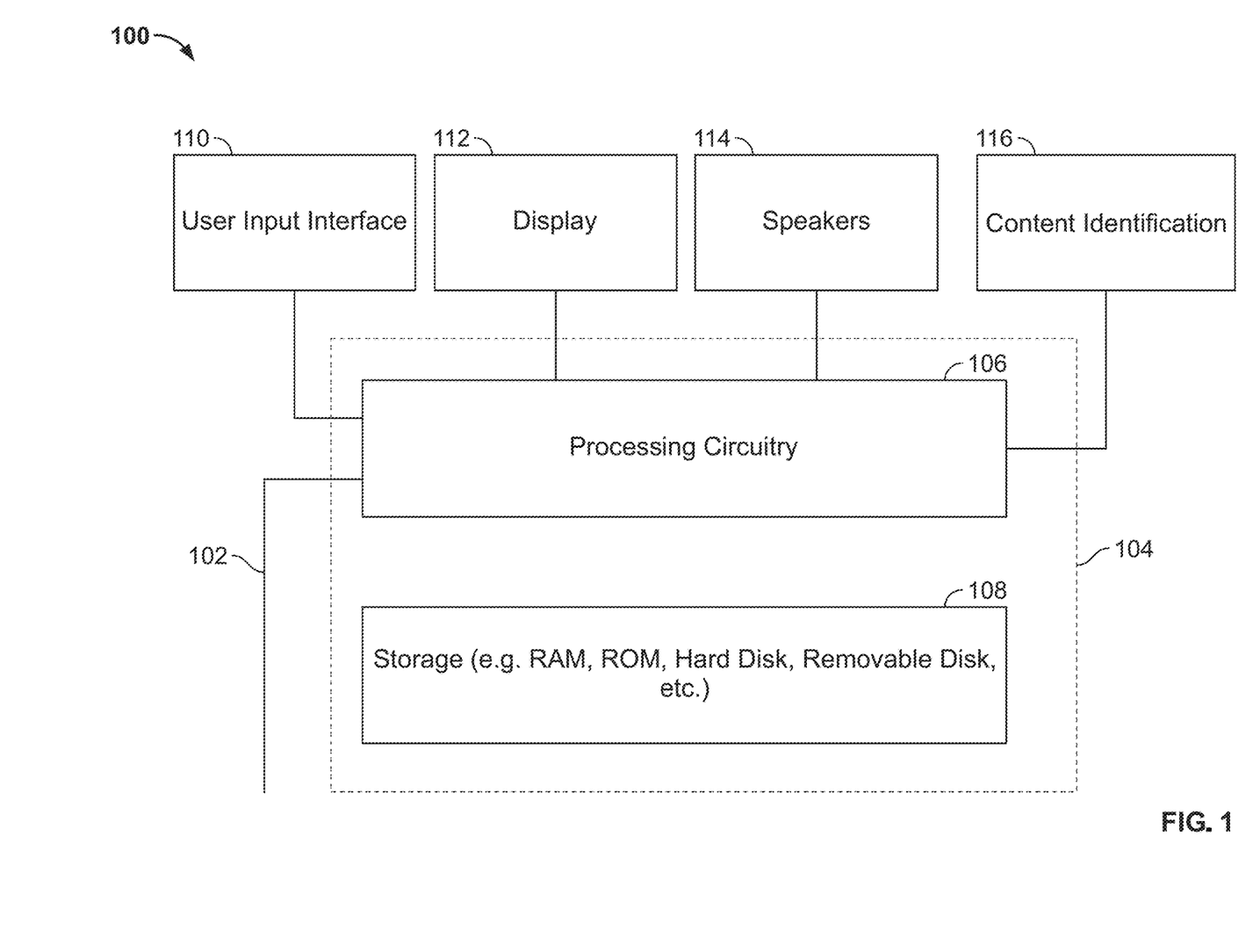
FIG. 1 shows an illustrative depiction of an example user device, in accordance with some embodiments of the present disclosure.

Users may access content and the media guidance application (and its display screens described above and below) from one or more of their user equipment devices. FIG. 1 shows a generalized embodiment of illustrative user equipment device 100. More specific implementations of user equipment devices are discussed below in connection with FIG. 2. User equipment device 100 may receive content and data via input/output (hereinafter "I/O") path 102. I/O path 102 may provide content (e.g., broadcast programming, on-demand programming, Internet content, content available over a local area network (LAN) or wide area network (WAN), and/or other content) and data to control circuitry 104, which includes processing circuitry 106 and storage 108. Control circuitry 104 may be used to send and receive commands, requests, and other suitable data using I/O path 102. I/O path 102 may connect control circuitry 104 (and specifically processing circuitry 106) to one or more communications paths (described below). I/O functions may be provided by one or more of these communications paths, but are shown as a single path in FIG. 1 to avoid overcomplicating the drawing.

Control circuitry 104 may be based on any suitable processing circuitry such as processing circuitry 106. As referred to herein, processing circuitry should be understood to mean circuitry based on one or more microprocessors, microcontrollers, digital signal processors, programmable logic devices, field programmable gate arrays (FPGAs), application-specific integrated circuits (ASICs), etc., and may include a multi-core processor (e.g., dual-core, quad-core, hexacore, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 104 executes instructions for a media guidance application stored in memory (i.e., storage 108). Specifically, control circuitry 104 may be instructed by the media guidance application to perform the functions discussed above and below. For example, the media guidance application may provide instructions to control circuitry 104 to generate the media guidance displays. In some implementations, any action performed by control circuitry 104 may be based on instructions received from the media guidance application.

In client-server based embodiments, control circuitry 104 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 2). In addition, communications circuitry may include circuitry that enables peer-to-peer communication of user equipment devices, or communication of user equipment devices in locations remote from each other.

Memory may be an electronic storage device provided as storage 108 that is part of control circuitry 104. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 108 may be used to store various types of content described herein as well as media guidance data described above. Nonvolatile memory may also be used (e.g., to launch a boot-up routine and other instructions). Cloud-based storage, described in relation to FIG. 2, may be used to supplement storage 108 or instead of storage 108.

Control circuitry 104 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 104 may also include scaler circuitry for upconverting and downconverting content into the preferred output format of the user equipment 100. Circuitry 104 may also include digital-to-analog converter circuitry and analog-to-digital converter circuitry for converting between digital and analog signals.

The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 108 is provided as a separate device from user equipment 100, the tuning and encoding circuitry (including multiple tuners) may be associated with storage 108.

A user may send instructions to control circuitry 104 using user input interface 110. User input interface 110 may be any suitable user interface, such as a remote control, mouse, trackball, keypad, keyboard, touchscreen, touchpad, stylus input, joystick, voice recognition interface, or other user input interfaces.

Display 112 may be provided as a stand-alone device or integrated with other elements of user equipment device 100. For example, display 112 may be a touchscreen or touch-sensitive display. In such circumstances, user input interface 112 may be integrated with or combined with display 112. Display 112 may be one or more of a monitor, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images.

In some embodiments, display 112 may be HDTV-capable. In some embodiments, display 112 may be a 3D display, and the interactive media guidance application and any suitable content may be displayed in 3D. A video card or graphics card may generate the output to the display 112. The video card may offer various functions such as accelerated rendering of 3D scenes and 2D graphics, MPEG5 2/MPEG-4 decoding, TV output, or the ability to connect multiple monitors. The video card may be any processing circuitry described above in relation to control circuitry 104. The video card may be integrated with the control circuitry 104. Speakers 114 may be provided as integrated with other elements of user equipment device 100 or may be stand-alone units. The audio component of videos and other content displayed on display 112 may be played through speakers 114. In some embodiments, the audio may be distributed to a receiver (not shown), which processes and outputs the audio via speakers 114. User equipment device 100 may also incorporate or be accessible to one or more other modules 116. For example, a content identification module 116 for identifying visual content, for example.

The media guidance application may be implemented using any suitable architecture. For example, it may be a stand-alone application wholly-implemented on user equipment device 100. In such an approach, instructions of the application are stored locally (e.g., in storage 108), and data for use by the application is downloaded on a periodic basis (e.g., from an out-of-band feed, from an Internet resource, or using another suitable approach). Control circuitry 104 may retrieve instructions of the application from storage 108 and process the instructions to generate any of the displays discussed herein. Based on the processed instructions, control circuitry 104 may determine what action to perform when input is received from input interface 110. For example, movement of a cursor on a display up/down may be indicated by the processed instructions when input interface 110 indicates that an up/down button was selected.

In some embodiments, the media guidance application is a client-server based application. Data for use by a thick or thin client implemented on user equipment device 100 is retrieved on-demand by issuing requests to a server remote to the user equipment device 100. In one example of a client-server based guidance application, control circuitry 104 runs a web browser that interprets web pages provided by a remote server. For example, the remote server may store the instructions for the application in a storage device. The remote server may process the stored instructions using circuitry (e.g., control circuitry 104) and generate the displays discussed above and below.

The client device may receive the displays generated by the remote server and may display the content of the displays locally on equipment device 100. This way, the processing of the instructions is performed remotely by the server while the resulting displays are provided locally on equipment device 100. Equipment device 100 may receive inputs from the user via input interface 110 and transmit those inputs to the remote server for processing and generating the corresponding displays. For example, equipment device 100 may transmit a communication to the remote server indicating that an up/down button was selected via input interface 110. The remote server may process instructions in accordance with that input and generate a display of the application corresponding to the input (e.g., a display that moves using a cursor up/down). The generated display is then transmitted to equipment device 100 for presentation to the user.

In some embodiments, the media guidance application is downloaded and interpreted or otherwise run by an interpreter or virtual machine (run by control circuitry 104). In some embodiments, the guidance application may be encoded in the ETV Binary Interchange Format (EBIF), received by control circuitry 104 as part of a suitable feed, and interpreted by a user agent running on control circuitry 104. For example, the guidance application may be an EBIF application. In some embodiments, the guidance application may be defined by a series of JAVA-based files that are received and run by a local virtual machine or other suitable middleware executed by control circuitry 104. In some of such embodiments (e.g., those employing MPEG-2 or other digital media encoding schemes), the guidance application may be, for example, encoded and transmitted in an MPEG-2 object carousel with the MPEG audio and video packets of a program.

Figure 2:
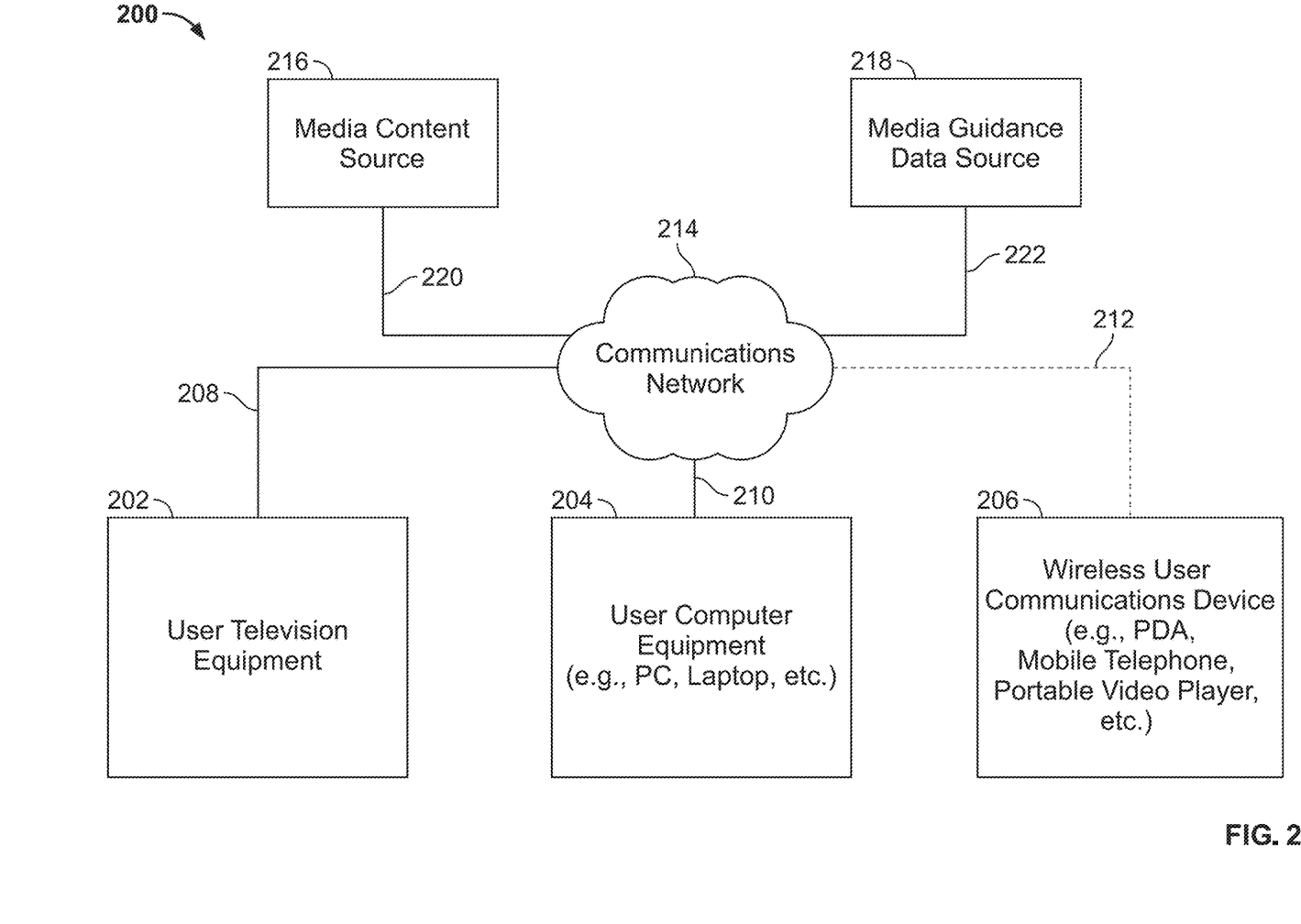
FIG. 2 shows a block diagram of an illustrative user equipment system, in accordance with some embodiments of the present disclosure.

User equipment device 100 of FIG. 1 can be implemented in system 200 of FIG. 2 as user television equipment 202, user computer equipment 204, wireless user communications device 206, or any other type of user equipment suitable for accessing content. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 1 may not be classified solely as user television equipment 202, user computer equipment 204, or a wireless user communications device 206. For example, user television equipment 202 may, like some user computer equipment 204, be Internet-enabled allowing for access to Internet content, while user computer equipment 204 may, like some television equipment 202, include a tuner allowing for access to television programming. The media guidance application may have the same layout on various different types of user equipment or may be tailored to the display capabilities of the user equipment. For example, on user computer equipment 204, the guidance application may be provided as a web site accessed by a web browser. In another example, the guidance application may be scaled down for wireless user communications devices 206.

In system 200, there may be more than one of each type of user equipment device but only one of each is shown in FIG. 2 to avoid overcomplicating the drawing. In addition, each user may utilize more than one type of user equipment device and also more than one of each type of user equipment device. In some embodiments, a user equipment device (e.g., user television equipment 202, user computer equipment 204, wireless user communications device 206) may be referred to as a "second screen device" or "secondary device".

The user may also set various settings to maintain consistent media guidance application settings, e.g., volume settings, across in-home devices and remote devices. Settings include programming preferences that the guidance application utilizes to make programming recommendations, display preferences, and other desirable guidance settings. For example, if a user sets a preferred volume level as a favorite volume level on, for example, a web site mobile phone, the same settings would appear on the user's in-home devices (e.g., user television equipment and user computer equipment), if desired. Therefore, changes made on one user equipment device can change the guidance experience on another user equipment device, regardless of whether they are the same or a different type of user equipment device.

The user equipment devices may be coupled to communications network 214. Namely, user television equipment 202, user computer equipment 204, and wireless user communications device 206 are coupled to communications network 214 via communications paths 208, 210, and 212, respectively. Communications network 214 may be one or more networks including the Internet, a mobile phone network, mobile voice or data network (e.g., a 4G or LTE network), cable network, public switched telephone network, or other types of communications network or combinations of communications networks. Paths 208, 210, and 212 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths.

Path 212 is drawn with dotted lines to indicate that in the exemplary embodiment shown in FIG. 2 it is a wireless path and paths 208 and 210 are drawn as solid lines to indicate they are wired paths (although these paths may be wireless paths, if desired). Communications with the user equipment devices may be provided by one or more of these communications paths, but are shown as a single path in FIG. 2 to avoid overcomplicating the drawing.

Although communications paths are not drawn between user equipment devices, these devices may communicate directly with each other via communication paths, such as those described above in connection with paths 208, 210, and 212, as well as other short-range point-to-point communication paths, such as USB cables, IEEE 1394 cables, wireless paths (e.g., Bluetooth, infrared, IEEE 702-11x, etc.), or other short-range communication via wired or wireless paths. BLUETOOTH is a certification mark owned by Bluetooth SIG, INC. The user equipment devices may also communicate with each other directly through an indirect path via communications network 214.

System 200 includes content source 216 and media guidance data source 218 coupled to communications network 214 via communication paths 220 and 222, respectively. Paths 220 and 222 may include any of the communication paths described above in connection with paths 208, 210, and 212. Communications with the content source 216 and media guidance data source 218 may be exchanged over one or more communications paths, but are shown as a single path in FIG. 2 to avoid overcomplicating the drawing. In addition, there may be more than one of each of content source 216 and media guidance data source 218, but only one of each is shown in FIG. 2 to avoid overcomplicating the drawing. (The different types of each of these sources are discussed below.) If desired, content source 216 and media guidance data source 218 may be integrated as one source device. Although communications between sources 216 and 218 with user equipment devices 202, 204, and 206 are shown as through communications network 214, in some embodiments, sources 216 and 218 may communicate directly with user equipment devices 202, 204, and 206 via communication paths (not shown) such as those described above in connection with paths 208, 210, and 212.

Content source 216 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 216 may be the originator of content (e.g., a television broadcaster, a Webcast provider, etc.) or may not be the originator of content (e.g., an on-demand content provider, an Internet provider of content of broadcast programs for downloading, etc.). Content source 216 may include cable sources, satellite providers, on-demand providers, Internet providers, over-the-top content providers, or other providers of content. Content source 216 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 218 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

Media guidance applications may be, for example, stand-alone applications implemented on user equipment devices. For example, the media guidance application may be implemented as software or a set of executable instructions which may be stored in storage 108, and executed by control circuitry 104 of a user equipment device 100. In some embodiments, media guidance applications may be client-server applications where only a client application resides on the user equipment device, and server application resides on a remote server. For example, media guidance applications may be implemented partially as a client application on control circuitry 104 of user equipment device 100 and partially on a remote server as a server application (e.g., media guidance data source 218) running on control circuitry of the remote server. When executed by control circuitry of the remote server (such as media guidance data source 218), the media guidance application may instruct the control circuitry to generate the guidance application displays and transmit the generated displays to the user equipment devices. The server application may instruct the control circuitry of the media guidance data source 218 to transmit data for storage on the user equipment. The client application may instruct control circuitry of the receiving user equipment to generate the guidance application displays.

Content and/or media guidance data delivered to user equipment devices 202, 204, and 206 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. YouTube is a trademark owned by Google Inc., Netflix is a trademark owned by Netflix Inc., and Hulu is a trademark owned by Hulu, LLC. OTT. In addition to content and/or media guidance data, providers of OTT content can distribute media guidance applications (e.g., web-based applications or cloud-based applications), or the content can be displayed by media guidance applications stored on the user equipment device.

Media guidance system 200 is intended to illustrate various approaches, or network configurations, by which user equipment devices and sources of content and guidance data may communicate with each other for the purpose of accessing content and providing media guidance. The embodiments described herein may be applied in any approach that does not deviate from the teachings of this disclosure, for example in a system employing an approach for delivering content and providing media guidance.

In an example approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 214. These cloud resources may include one or more content sources 216 and one or more media guidance data sources 218. In addition or in the alternative, the remote computing sites may include other user equipment devices, such as user television equipment 202, user computer equipment 204, and wireless user communications device 206. For example, the other user equipment devices may provide access to a stored copy of a video or a streamed video.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 1.

Closed captioning and subtitling are processes of displaying text on a visual display, e.g., a TV, to provide additional textual or interpretive information. Closed captions and subtitles may also be referred to colloquially as timed text. Timed text comprises text and timing information and refers to the presentation of textual content in sync with a media asset. Timed text is typically shown as a transcription of an audio portion of a media asset, e.g., a video, as it occurs in substantially real time. In example embodiments, closed captions can be used to describe a transcription or translation of the dialogue, sound effects, relevant musical cues, and other relevant audio information when sound is unavailable or not clearly audible, and subtitles may be thought of as transcription or translation of the dialogue when sound is available but generally not understood.

In conventional systems, closed captioning and subtitling both utilize audio-to-text recognition as video segments are downloaded by a client device. Today, online content services and TV services utilize live closed-captioning/subtitling software to transcribe audio with dialogue or even, in some cases, to detect and transcribe non-speech elements such as the sound of thunder, a baby crying or a dog barking, for example. Conventional systems are typically powered by artificial intelligence and automatic speech recognition (ASR) software. The output of the timed text software is fed to a timed text encoder and delivered as a timed-text file to a media player or client device.

The timed-text file is a container file for segments of metadata that are time-aligned with a video or audio resource, i.e., in sync with a media asset. It can therefore be regarded as a serialization format for time-aligned data. A timed-text file starts with a header and then contains a series of data blocks. If a data block has a timing schedule, such as a start and end time, it may be called a cue. A comment is another example of a data block. Timed text caption or subtitle cues are processed and rendered as overlays on top of a media asset viewport or into a region, which is a subarea of the video viewport.

Timed text is often provided in a format known as Web Video Text Tracks (WebVTT), which is a World Wide Web Consortium (W3C) standard for displaying timed text in connection with the HTML5 <track> element. Other common caption formats include XML-based Timed text Markup Language (TTML) and the "SubRip" file format. Timed text typically comprises a header and a plurality of data blocks. In some examples, the header of the timed-text file identifies the format that the timed-text file is in, e.g., WebVTT, TTML, SubRip, or the like. In some embodiments, the data blocks may be one or more of a text for display, a timing schedule, the relevance index, an indication of priority, or a context tag. Other examples of data blocks include chapters, metadata on the scene, the speakers, typesetting and fonts. For example, when the data block is a timing schedule, the timing schedule comprises a start time and an end time for displaying the text for display. It will be appreciated that any timed text format may be considered as falling within the scope of the various embodiments described herein.

In some examples, there may be a minimum duration that the timing schedule indicates. For example, a minimum duration of ⅚ (five-sixths) of a second per subtitle event, e.g., 20 frames for 24 frames per second of video, although any period may be chosen as a minimum duration. In addition, in some examples, there may be a maximum duration that the timing schedule indicates. For example, the timing schedule may comprise a start time and a duration of 5 seconds, e.g., 120 frames for 24 frames per second video starting at 1 second.

In some cases, timed text data can be embedded into a media asset file, e.g., video file, or delivered separately in what is known as a sidecar file. The video and associated audio transcription are output at a client or media device in sync as the device receives the transcript and timing information for when the audio transcription is to be presented. Client devices that have a parser can apply the properties of the encoded timed text accordingly.

However, the same process cannot be implemented for live content or on-demand content that requires real time transcription of content. During live content, for example, the timed-text file can be transmitted to the media device only as transcriptions become available, as there is no way to predict the audio that will be output at a future time instance, e.g., 5 minutes from the live stream, for example.

Figure 3:
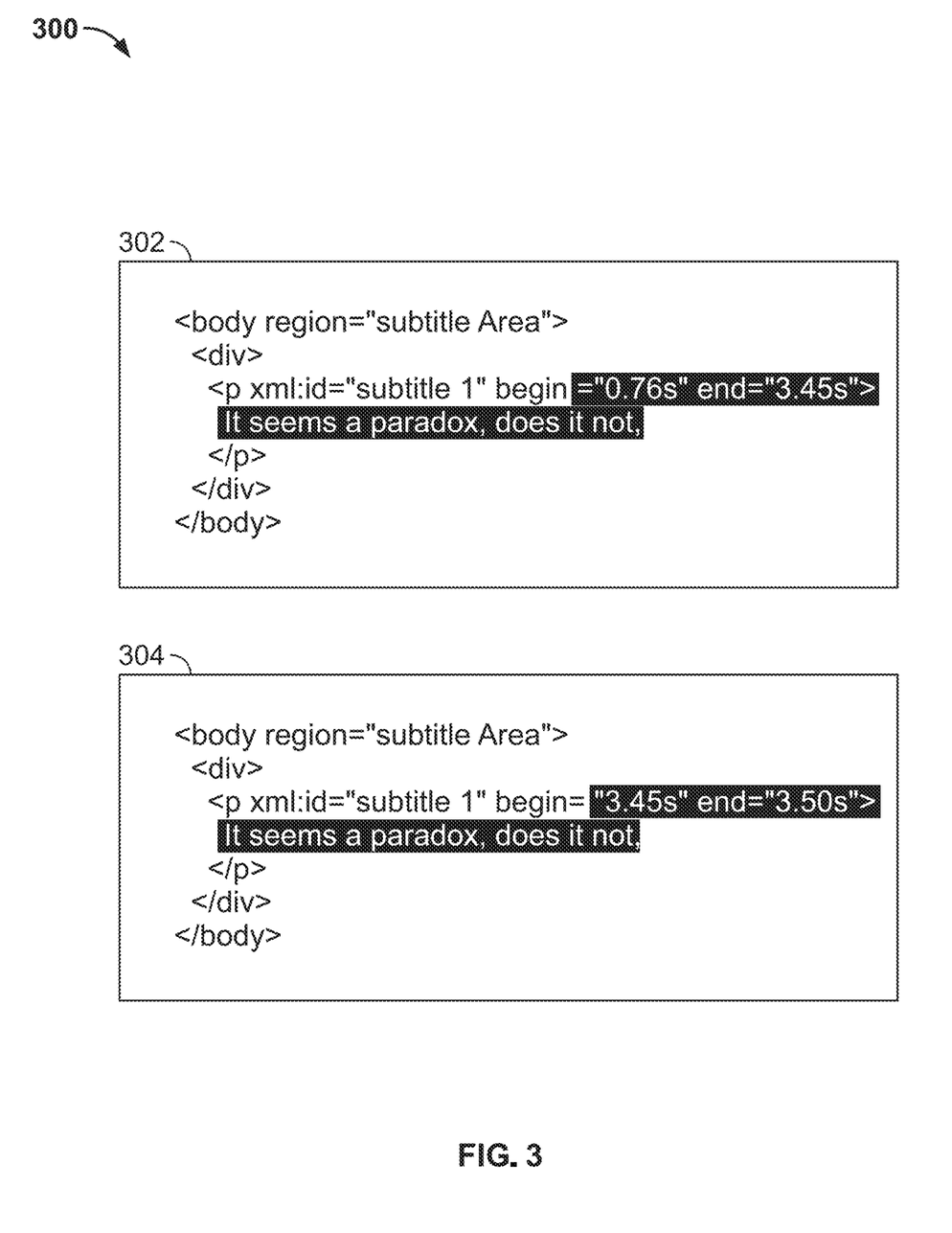
FIG. 3 is a block diagram illustrating an example conventional method of providing timed text.

With reference to FIG. 3, the process in which typical subtitle segments are presented to the user will now be described. FIG. 3 illustrates exemplary timed-text files 300, in accordance with conventional methods.

As shown at 302 of FIG. 3, an example timed-text segment is provided, "It seems a paradox, does it not," to be presented during the period 0.76 seconds to 3.45 seconds along with the properties signaled using the TTML format, although other formats are available. In live scenarios, timed text cues are often repeated, which results in a duplication of cues or text strings, as shown as 304 of FIG. 3. When duplication of timed text occurs, timed-text segments are signaled again to the media device, which in turn requires the media device to reprocess the timed-text segment. Every time a timed-text segment is transmitted to the media device, additional bytes are signaled to the device. Therefore, when duplication or repetition of timed-text segments occurs, additional redundant bytes may be signaled and the process is therefore computationally inefficient.

Methods and systems described herein may be compatible with adaptive IP video content. Adaptive video streaming, also known as adaptive bitrate streaming, has various bitrate variants of the same content, and an appropriate video variant is chosen based on the available bandwidth. As it is known, adaptive streaming is a technology designed to deliver media content to the user in the most efficient way possible and in the highest usable quality for each specific user. The adaptation determines the most ideal video file quality to reduce buffering and ensure a smooth user viewing experience. Therefore, in situations where there is low bandwidth, the additional or unnecessary transmission of timed-text files may result in the client device retrieving a video bitrate of lower quality, which will inevitably impact the user's viewing experience.

Additionally, as timed-text segments are processed locally at the media device, timed-text segments have to be re-drawn from the timed text encoder, for example. When timed-text segments are re-drawn at short intervals, this results in a flicker of the timed-text segment, or the text segment, on the display of the media device. Furthermore, at higher resolutions or when media content is being consumed on a large screen device, for example, the duplications of timed-text segments occurring at the media device can be particularly noticeable to the user and may result in distractions or a poor user experience, especially as the frequency of duplications increases.

In view of the foregoing, there is a need to provide timed text more efficiently and effectively. More specifically, it would be beneficial to have a method and system that reduces the signaling of unnecessary bytes to a media device and provides a more efficient way of providing timed text to the media device. Improved closed captioning and subtitling methods, mechanisms, techniques and systems described herein are introduced to provide a better viewing experience for a viewer of a media asset such as video, audio, or the like.

In example embodiments, timed text may comprise metadata that enable captions or subtitles for video content, text video descriptions, chapters for content navigation, and more generally any form of metadata that is time-aligned with audio or video content. For example, timed text can comprise speech and/or non-speech elements. Non-speech elements may include, for example, a sound of a dog barking, a baby crying, or the like. Both speech and non-speech elements of the timed text will herein be described as a text segment of the timed-text segment.

Repetition of words and phrases is common in English dialogue. The present disclosure relates to leveraging repetition of content to transmit less closed caption data to a client device. For example, a timed text encoder may signal words or phrases that are being repeated often during the transcription process and notify the media device to maintain a buffer with references to repeated words. Upon determining that the transcribed text is repeated during a live stream, for example, the media player may retrieve content from an index, if previously stored. In example embodiments, as audio is transcribed, upon determining that a transcription matches, using a referencing mechanism, the transcription to a previously indexed timed-text segment or text segment, a text segment can be retrieved from the index.

By implementing a referencing mechanism, the signaling of additional redundant data can be avoided and the processing system can be more efficient. In some embodiments, a method is provided for implementing the referencing mechanism across timed-text segments and signaling only differential data between a new timed-text segment and matched timed-text segment. For example, the string or text segment may be the same, but the time stamp or time segment may be different. In this case, since the text segment is determined to be the same in both the new timed-text segment and the matched timed-text segment, the mechanism will only transmit properties that are different between the new timed-text segment and the matched timed-text segment and signal only what is required. In some embodiments, a reference to a previous timed-text segment may be provided for display along with the other properties determined to be different between the timed-text segments.

In one example, if a non-speech element, e.g., a dog barking, is heard 5 minutes into a live stream, and the media device has cached the transcription, text-segment, or timed-text segment comprising the text segment "dog barking" from a previous instance, the text segment "dog barking" will not be transmitted to the media device. Instead, a reference to the cached transcription, stored locally at the media player in the index, is retrieved to provide a reference output or to provide the referenced text segment in place of the text segment of the new timed-text segment, for example.

It is also known that the cloud-based timed text software can transmit information about the speaker, e.g., his/her name, so that the timed text data displays such information. Such capability can be available via the use of software to detect who the speaker is via video/audio analysis, e.g., using a content identification mechanism. For example, a transcription may recite "Person A: I am heading out, see you later." Thus, in another example of the present invention, the speaker's name may also be cached and stored in the media device's index of repeated text segments, which can be automatically retrieved from the local index for display based on information/commands received from the encoder.

As discussed above, for live scenarios, words, phrases, strings, speech or other non-speech elements can be indexed based on a real time transcription of audio content. Since audio is transcribed to provide timed text for display at the client device, the client device may continuously identify the number of times a particular word, phrase, or text segment, etc., is repeated in the media asset. One or more text segments of timed text occurring most commonly during a live stream, for example, may be buffered in the index located at the client device. The index can be maintained in the memory storage of the client device to temporarily store timed text data during consumption of a media asset such as a live stream. The index can be a list or an array and acts as a buffer for text segments. The index may comprise index locations for ease of reference for the encoder and media device. For example, if the media player is caching repeated terms, words, or phrases into a list or array, based on commands to do so, an index location may be transmitted to inform the media player which element to access from the list for display. For example, a list of ten text segments may have index locations from zero to nine.

In example embodiments, the timed text encoder may signal to the decoder, located at the media player, what is being repeated during the transcription phase and the occurrence of each timed-text segment in order to store and/or maintain text segments in the local index. Upon determining that a previously stored text segment is repeated during a live stream, for example, the text segment may be retrieved from the index rather than transmitting the text segment from the encoder. For example, the timed text encoder may transmit the timing information of the new timed-text segment to be processed with the referenced or matched text segment retrieved from the local index.

In some embodiments, determining whether to add a text segment to the index may be based on a predetermined threshold setting. For example, the predetermined threshold setting may be a threshold setting associated with previous occurrences of the same text segment during the media asset up to that point. For example, the threshold setting may be predetermined to store text segments of timed-text segments upon determining that the same text segment has been repeated more than four times during a live stream. Alternatively, or additionally, the threshold setting may be any other suitable requirement setting to trigger a local indexing operation for text segments.

Figure 4:
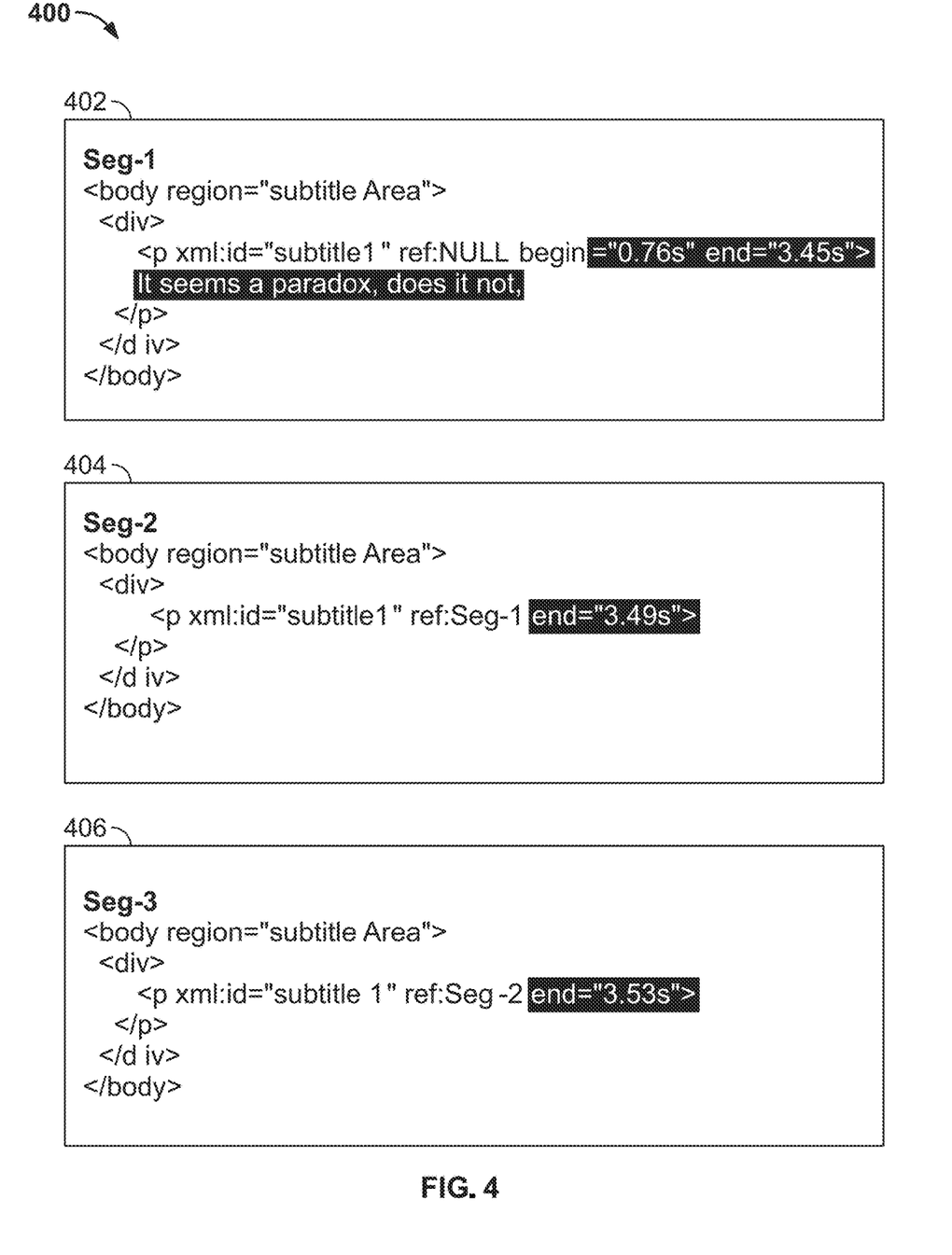
FIG. 4 is an illustrative block diagram of providing timed text to a media device in sync with a media asset, in accordance with some embodiments of the present disclosure.

With reference to FIG. 4, the process in which timed-text segments are referenced at the media device in accordance with various embodiments of the present disclosure will now be described.

As shown in FIG. 4, an example timed-text segment 402 is provided with a text segment stating "It seems a paradox, does it not." The text segment is to be presented during the period 0.76 seconds to 3.45 seconds along with the properties signaled using the TTML format, although other formats are available. When duplication of timed text occurs, rather than signaling the subsequent timed-text segment repeatedly to the media device, a second timed-text segment 404 may be provided with a reference to the first timed-text segment 402 or to the text segment of the first timed-text segment 402, thereby, mitigating the need to transmit additional bytes from the encoder to the client device. Similarly, if the timed text occurs for a third time, upon transcribing the audio content of the media asset, the encoder may notify the media device to retrieve the text segment from its index and only transmit the time segment of the third timed-text segment 406.

Figure 5:
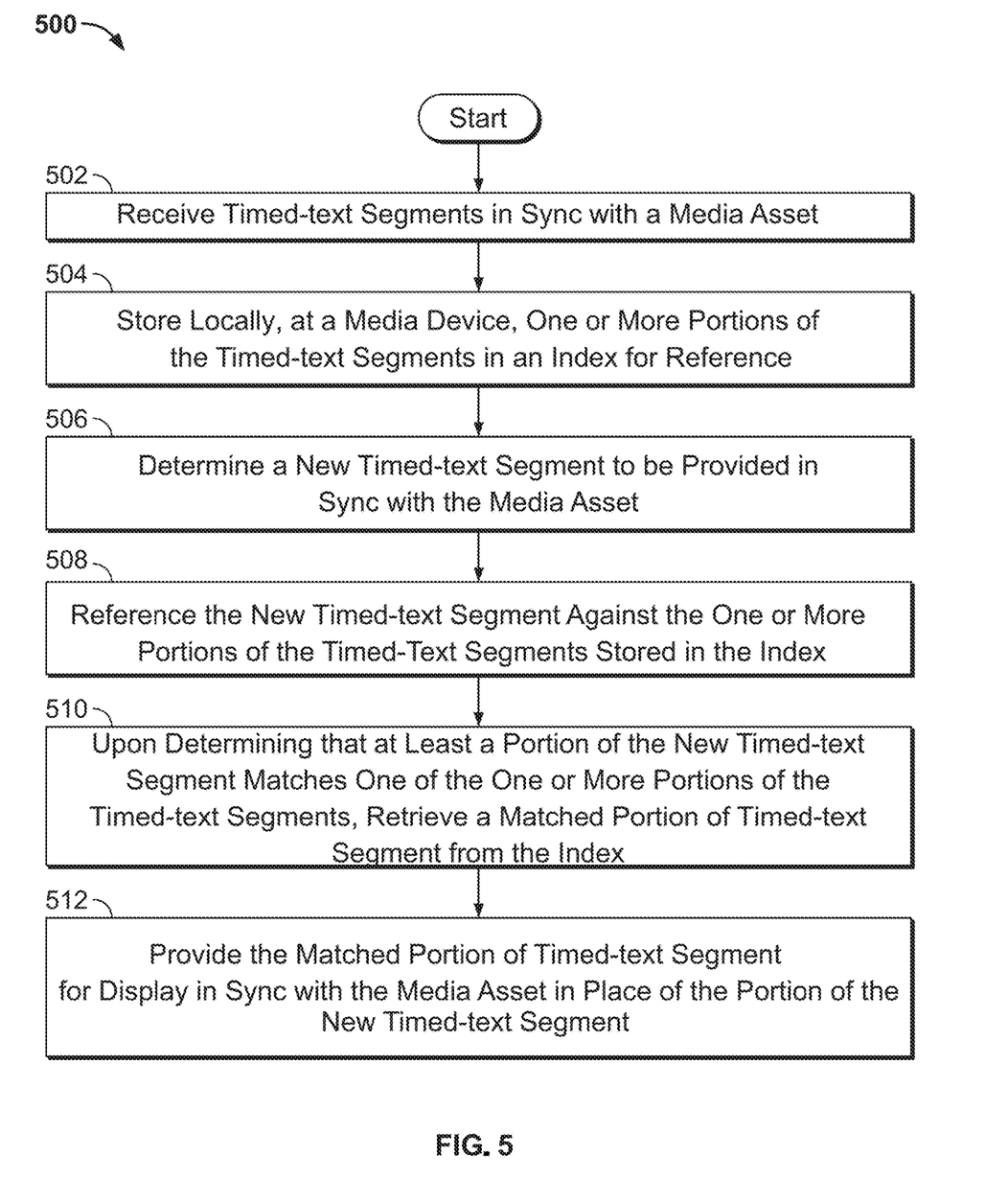
FIG. 5 is an illustrative flowchart for providing timed text to a media device in sync with a media asset, according to various embodiments of the present disclosure.

FIG. 5 is a flowchart of illustrative steps involved in providing timed text for live media content. It should be noted that process 500 or any step thereof could be performed on, or provided by, any of the devices shown in FIGS. 1-2. For example, process 500 may be executed by control circuitry 104 (FIG. 1) as implemented on user equipment 202, 204, and/or 206 (FIG. 2). In addition, one or more steps of process 500 may be incorporated into or combined with one or more steps of any other process or embodiment disclosed herein.

At step 502, a media device receives timed text in sync with a media asset. As described above, timed text comprises text and timing information and refers to the presentation of textual content in sync with a media asset being consumed by a user.

At step 504, one or more portions, e.g., text segments, of timed-text segments are stored locally, at the media device, in an index for reference. In example embodiments, one or more portions of timed-text segments repeated the most during the live stream may be buffered in an index locally at the client device.

At step 506, the system determines a new timed-text segment to be provided in sync with the media asset.

At step 508, the system references the new timed-text segment against the one or more portions of the timed-text segments stored in the index. In some embodiments, a method is provided for implementing a referencing mechanism across timed-text segments and signaling only differential data between a new timed-text segment and stored timed-text segments.

At step 510, upon determining that at least a portion of the new timed-text segment matches one of the one or more portions of timed-text segments, the system retrieves a matched portion of timed text from the index.

At step 512, the system provides the matched portion of timed-text segment for display in sync with the media asset in place of the portion of the new timed-text segment.

Figure 6:
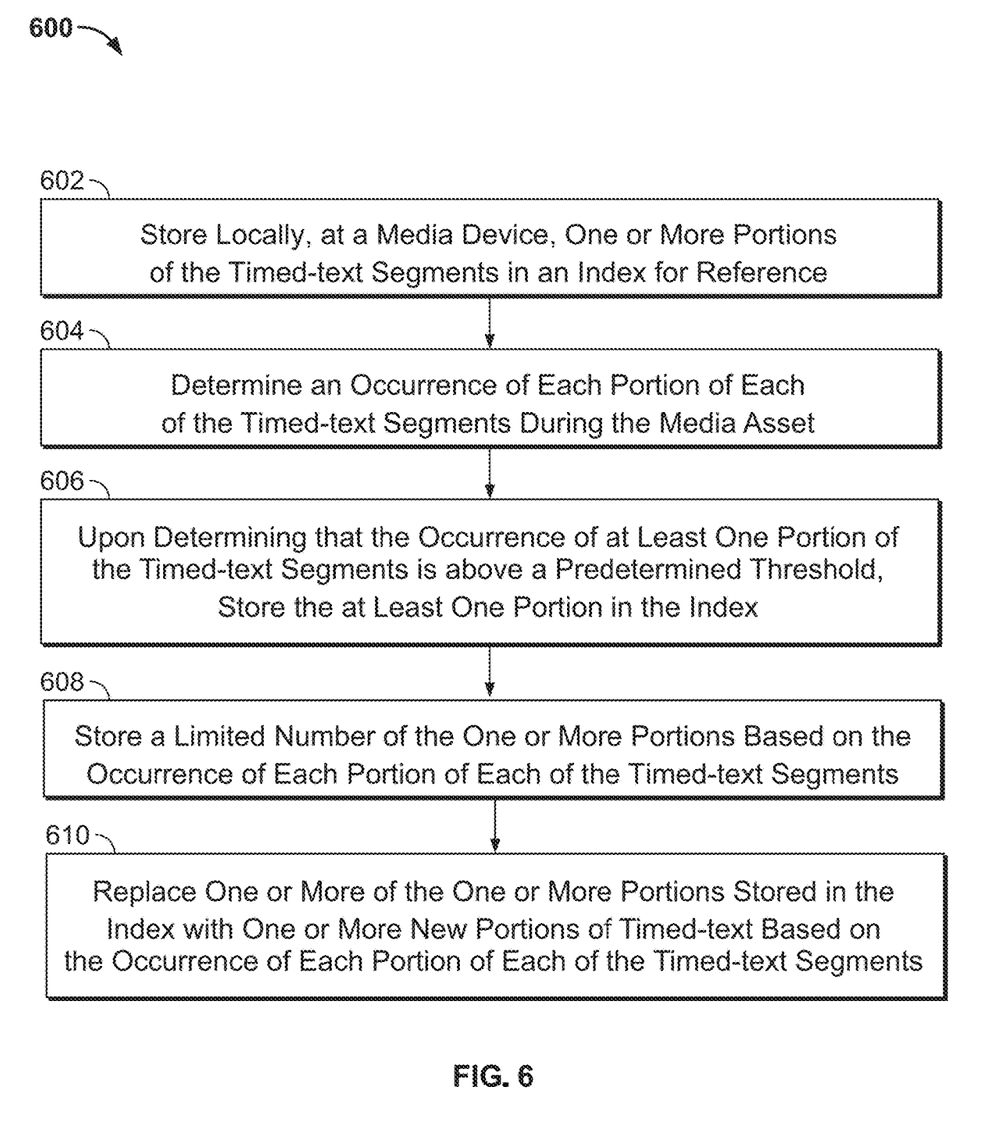
FIG. 6 is an illustrative flowchart for storing, at a media device, one or more portions of the timed text in an index for reference, according to various embodiments of the present disclosure.

FIG. 6 is a flowchart of illustrative steps involved in storing locally, at a media device, one or more portions of the timed text in an index for reference. It should be noted that process 600 or any step thereof could be performed on, or provided by, any of the devices shown in FIGS. 1-2. For example, process 600 may be executed by control circuitry 104 (FIG. 1) as implemented on user equipment 202, 204, and/or 206 (FIG. 2). In addition, one or more steps of process 600 may be incorporated into or combined with one or more steps of any other process or embodiment disclosed herein.

At step 602, one or more portions, e.g., text segments, of timed-text segments are stored locally, at the media device, in an index for reference.

At step 604, the system determines an occurrence of each portion, e.g., a text segment, of timed-text segments during the media asset.

At step 606, upon determining that the occurrence of at least one portion of the timed-text segment is above a predetermined threshold, the system stores the at least one portion of the timed-text segment in the index. For example, the predetermined threshold setting may be a threshold setting associated with the previous occurrence of a text segment during the media asset up to that point. For example, a threshold setting may be predetermined to store text segments of timed-text segments upon determining that the same text segment has been repeated more than four times during a live stream.

At step 608, the system stores a limited number of the one or more portions of timed-text segments based on the occurrence of text segments.

At step 610, the system replaces or overwrites the one or more portions of timed-text segments stored in the index with one or more new portions based on the occurrence of each portion of timed-text segments. In some examples, the system may determine to replace or overwrite a text segment stored in the index with a new text segment as its occurrence during the streaming of content increases over time. In such cases, an occurrence of each text segment of timed-text segments may be recorded locally or at the encoder to assess whether it would be efficient to replace a text segment that is currently stored in the index. In some embodiments, the whole index may be overwritten. For example, the index may be cleared or emptied when it is determined that the viewer has stopped consuming the media asset or has started viewing a different media asset. Alternatively, or additionally, the index may be overwritten entirely based on content identification. For example, during a live news program, a plurality of news topics may be presented by a news anchor. In such cases, the index may be cleared at the end of each news topic or at the start of a new news topic. Alternatively, each index may be maintained until the end of the news program or the start of a new media asset consumed by the viewer.

In some embodiments, there may be a one or more data buffers or indexes for storing timed-text segments or a portion of timed-text segments. In some embodiments, one or more indexes may be categorized. For example, one or more categories may be any one or more of speech elements, non-speech elements, text spoken by a specific character or person or a location. Timed-text segments can be stored according to each segment's association with the one or more categories. For example, during a live news program, if the news focusses on a particular sports personality and the sportsperson's name occurs multiple times during the live news program, the name of the sportsperson may be stored in a character index and a name of a sports team may be stored in a sports team index.

As referred to herein, the term "in response to" refers to initiated as a result of. For example, a first action being performed in response to a second action may include interstitial steps between the first action and the second action. As referred to herein, the term "directly in response to" refers to caused by. For example, a first action being performed directly in response to a second action may not include interstitial steps between the first action and the second action.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes.

Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time.

It will be appreciated that the media guidance application may perform one or more of the functions described above simultaneously. It should also be noted, the systems and/or methods described above may be applied to, or used in accordance with, other systems and/or methods. Additionally any of the steps in said processes can be performed in any order, can be omitted, and/or can be combined with any of the steps from any other process.

While some portions of this disclosure may make reference to "convention," any such reference is merely for the purpose of providing context to the invention(s) of the instant disclosure, and does not form any admission as to what constitutes the state of the art.

What is claimed is:

1. A method of providing timed text for live media content, the method comprising:
receiving, by a media device from a server, a timed-text segment in sync with a media asset;
generating for display on the media device the timed-text segment with at least one frame of the media asset;
determining that the timed-text segment has been received a threshold number of times wherein the threshold number is more than one;
in response to the determining that the timed-text segment that was generated for display with the at least one frame of the media asset has been received the threshold number of times, storing locally, in a local memory of the media device, the timed-text segment in an index in association with a reference identifier;
receiving, by the media device, the reference identifier and an indication that the timed-text segment associated with the reference identifier is to be provided in sync with the media asset;
retrieving the timed-text segment stored in the local memory of the media device based on the reference identifier; and
generating for display the retrieved timed-text segment for display in sync with at least one other frame of the media asset.

2. The method of claim 1, wherein the server:
transcribes at least one of a speech element or a non-speech element of the media asset; and
provides at least one of the transcribed speech element or the transcribed non-speech element to the media device for display in sync with the media asset.

3. The method of claim 1, wherein the local memory of the media device stores a limited number of timed-text segments based on an occurrence of each of the timed-text segments.

4. The method of claim 1, further comprising:
replacing a stored timed-text segment in the index with the timed-text segment based on comparing an occurrence of the stored timed-text segment to an occurrence of the timed-text segment.

5. The method of claim 1, wherein the index comprises one or more sub-indexes based on one or more categories comprising any one or more of: speech elements; non-speech elements; a character; or a location.

6. The method of claim 5, wherein the one or more categories are determined using content identification.

7. The method of claim 1, further comprising:
determining a portion of the timed-text segment; and
storing locally, in the local memory of the media device, the portion of the timed-text segment in the index in association with a unique reference identifier.

8. The method of claim 1, further comprising:
comparing, by the server, a new timed-text segment to each stored timed-text segment in the index;

determining a match between the new timed-text segment and the timed-text segment; and in response to the determination of the match between the new timed-text segment and the timed-text segment, identifying the reference identifier associated with the timed-text segment.

9. A system comprising control circuitry configured to execute the method of claim 1.

10. A system of providing timed text for live media content, the system comprising:

a local memory configured to store timed-text segments in an index; and control circuitry configured to:
receive, by a media device from a server, a timed-text segment in sync with a media asset;
generate for display on the media device the timed-text segment with at least one frame of the media asset;
determine that the timed-text segment has been received a threshold number of times wherein the threshold number is more than one;
in response to the determination that the timed-text segment that was generated for display with the at least one frame of the media asset has been received the threshold number of times, store locally, in the local memory of the media device, the timed-text segment in the index in association with a reference identifier;
receive, by the media device, the reference identifier and an indication that the timed-text segment associated with the reference identifier is to be provided in sync with the media asset;
retrieve the timed-text segment stored in the local memory of the media device based on the reference identifier; and
generate for display the retrieved timed-text segment for display in sync with at least one other frame of the media.

11. The system of claim 10, wherein the server:
transcribes at least one of a speech element or a non-speech element of the media asset; and
provides at least one of the transcribed speech element or the transcribed non-speech element to the media device for display in sync with the media asset.

12. The system of claim 10, wherein the local memory is further configured to:
store a limited number of timed-text segments based on an occurrence of each of the timed-text segments.

13. The system of claim 10, wherein the control circuitry is further configured to:
replace a stored timed-text segment in the index with the timed-text segment based on comparing an occurrence of the stored timed-text segment to an occurrence of the timed-text segment.

14. The system of claim 10, wherein the index comprises one or more sub-indexes based on one or more categories comprising any one or more of: speech elements; non-speech elements; a character; or a location.

15. The system of claim 14, wherein the one or more categories are determined using content identification.

16. The system of claim 10, wherein the control circuitry is further configured to:

determine a portion of the timed-text segment; and
store locally, in the local memory of the media device, the portion of the timed-text segment in the index in association with a unique reference identifier.

17. The system of claim 10, wherein the control circuitry is further configured to:
compare a new timed-text segment to each stored timed-text segment in the index;
determine a match between the new timed-text segment and the timed-text segment; and
in response to the determination of the match between the new timed-text segment and the timed-text segment, identify the reference identifier associated with the timed-text segment.

18. A non-transitory computer-readable medium comprising non-transitory computer-readable instructions encoded thereon for providing timed text for live media content, the instructions comprising the steps of:
receiving, by a media device from a server, a timed-text segment in sync with a media asset;
generating for display on the media device the timed-text segment with at least one frame of the media asset;
determining that the timed-text segment has been received a threshold number of times wherein the threshold number is more than one;
in response to the determining that the timed-text segment that was generated for display with the at least one frame of the media asset has been received the threshold number of times, storing locally, in a local memory of the media device, the timed-text segment in an index in association with a reference identifier;
receiving, by the media device, the reference identifier and an indication that the timed-text segment associated with the reference identifier is to be provided in sync with the media asset;
retrieving the timed-text segment stored in the local memory of the media device based on the reference identifier; and
generating for display the retrieved timed-text segment for display in sync with at least one other frame of the media asset.

19. The non-transitory computer-readable medium of claim 18, wherein the step of receiving timed-text segments comprises:
transcribing, at the server, at least one of a speech element or a non-speech element of the media asset; and
providing at least one of the transcribed speech element or the transcribed non-speech element to the media device for display in sync with the media asset.

20. The non-transitory computer-readable medium of claim 18, wherein the instructions further comprise the steps of:
comparing, by the server, a new timed-text segment to each stored timed-text segment in the index;
determining a match between the new timed-text segment and the timed-text segment; and
in response to the determination of the match between the new timed-text segment and the timed-text segment, identifying the reference identifier associated with the timed-text segment.

* * * * *